United States Patent [19]
Walach

[11] Patent Number: 5,953,099
[45] Date of Patent: Sep. 14, 1999

[54] NONPROGRESSIVE MULTI-FOCAL OPHTHALMIC LENS

[76] Inventor: Michael Walach, 6944 NW. 26th St., Margate, Fla. 33063

[21] Appl. No.: 08/955,550

[22] Filed: Oct. 22, 1997

[51] Int. Cl.$^6$ ........................................... G02C 7/06
[52] U.S. Cl. ............................................. 351/168; 351/171
[58] Field of Search ..................................... 351/168, 169, 351/159, 171

[56] References Cited

U.S. PATENT DOCUMENTS

| | | | |
|---|---|---|---|
| 4,806,010 | 2/1989 | Ewer et al. | 351/169 |
| 4,869,588 | 9/1989 | Frieder et al. | 351/168 |
| 5,305,028 | 4/1994 | Okano | 351/169 |

Primary Examiner—Scott J. Sugarman
Attorney, Agent, or Firm—Malin, Haley, Dimaggio & Crosby, PA

[57] ABSTRACT

A non-progressive multi-focal ophthalmic lens having a first arcuate area for distance viewing and a second arcuate segment, whereby the first area and second segment share a seamless transition corridor that does not obstruct or distort vision when shifting the eyes between the first area and second segment. The second segment is substantially C-shaped and defines the transition corridor at its top end. The second segment has a smaller radius of curvature than the first area and shares a common tangential component with the first area. The first area and reading segment are designed and manufactured in a way that eliminates the dividing line, image jump and distortion when moving the eyes between distance and near vision areas and obstructions to peripheral and downward vision.

11 Claims, 3 Drawing Sheets

NONPROGRESSIVE MULTI-FOCAL OPHTHALMIC LENS

BACKGROUND OF THE INVENTION

1. Field of the Invention

This invention relates generally to multi-focal lenses, and more particularly to nonprogressive bifocal lenses that eliminate image jump, distortion, and loss of image as one moves their eyes from the distance segment to the reading segment. The instant invention also provides a safer bifocal lens in that it has a smaller reading segment that does not obstruct ones peripheral vision and vision while climbing stairs and when walking on the streets and sidewalks. The lens provided by the invention offers a convenient, useful, non-obstructive and safe alternative for active people over forty years of age.

2. Description of the Background Art

Multi-focal lenses generally comprise bifocals and trifocals. Bifocals include two lenses having different curvatures to offer the convenience of distance and reading vision in the same pair of eyeglasses. Bifocals compensate for loss of accommodation, i.e. presbyopia. Trifocals typically provide a third lens adjacent the second for improving vision in the near viewing range, but outside the reading range. The most popular bifocals today are the flat top lens and progressive lens. Despite the convenience offered by flat tops, progressive and other multi-focal lenses, there have been compromising tradeoffs, such as image jump, loss of image, distortion, loss of peripheral vision and obstruction or distortion when looking down. The loss or obstruction of peripheral and downward vision interferes with the side rear view mirrors when driving and the ability to see clearly when climbing stairs, walking in the streets and entering and exiting buses and street cars. This is because conventional distance and reading segments are separated by visible lines and/or uncontrolled random blending, resulting in image jump, image loss, and loss of continuity. Conventional reading segments are also larger than necessary. Objects become hidden behind the dividing line and outer portions of the reading segment creating confusion and longer vision adaptation periods. Accordingly, these tradeoffs are a result of inherent design flaws which the industry has unsuccessfully tried to correct.

The evolution of the multi-focal lens began with the bifocal, invented by Ben Franklin. The original bifocal, also known as the executive bifocal, comprises an upper lens and lower lens divided by an unsightly, thick center line, as seen in FIG. 1a. In addition to being unattractive, objects disappear behind the dividing line when the eye moves between the top and bottom vision areas. In the 1890s, the round bifocal, shown in FIG. 1b, was introduced as a cosmetic improvement over the executive, but it introduced excessive image jump and provided a smaller reading area.

With reference to FIG. 1c, the most popular bifocal lens is the flat top 1. The flat top bifocal was introduced in the 1920s and the FT-28 has become the most widely used bifocal eyeglass. The FT-28 stands for a flat top lens having a reading segment with a 28 mm width. Flat tops are simply round bifocals with the upper portion cut away or removed, bringing the optical center of the reading segment closer to the top line, thereby reducing image jump by 50 percent. Nonetheless, 50 percent of the image jump still remains, continuing to cause patient adaptation problems and visual disturbance. Like the executive, objects still become lost when entering the segment area through the top of the line.

Referring to FIGS. 1c, 9 and 10, the flat bifocal lens obstructs distance vision when driving and climbing stairs because of its size and construction. The reading segment size impairs downward distance vision and the corners 3 obstruct peripheral vision, thus affecting a driver's ability to use the side rear view mirrors. The reading segment also has an upper edge and dividing line 4 which causes image jump and distortion when moving the eyes between the distance area and reading segment. In addition, the reading segment 2 extends low such that it obstructs vision when looking down to climb stairs, steps, etc.

Progressive lenses 5 and blended lenses, as seen in FIGS. 2a and 2b, respectively, were introduced to remove visible segment lines. Progressive lenses provide a continuous range of focal powers by using large numbers of radii in an attempt to give a gradual progression in vertically increasing power. The cosmetic benefits offered by progressive lenses is offset by peripheral astigmatism, distortion, aberrations, and loss of peripheral vision. The problem with progressive lenses is that each progressively shorter radius leaves an area of uncorrectable distortion as it departs from the connecting point, which is the vertical centerline of the segment. All progressive lenses include blended areas 6 which extend all the way to the edges of the lens, accounting for substantial loss of peripheral vision, as shown in FIG. 2b. Although the extended blended areas 6 are intended to minimize concentrated distortion, they still increase the range of distortion. The distortion zones found in most progressive lenses affect approximately 55 to 60 percent of the lens. Although the aesthetically unacceptable lines are not visible in progressive lenses, the wearer is plagued with excessive distortion. Another deficiency of progressive lenses is that they have narrow, long corridors 7 of power increase which are difficult for opticians to correctly position, especially for reading. It is also difficult for the user to aim the lens toward the reading area. Moreover, progressive lenses interfere with peripheral vision as shown by the circle 3.

In accordance with the above discussion, some examples of blended and progressive multi-focal lenses may be found in U.S. Pat. No. 4,952,048 issued to Frieder et al., 5,123,725 issued to Winthrop, 5,106,180 issued to Marie et al., and 4,955,712 issued to Barth et al. U.S. Pat. No. 5,351,100 issued to Schwenzfeier et al. discloses a glass multi-focal lens with a polarizing element to combine the features of multi-focal lenses with light protecting elements. Composite plastic lenses having thin lenses heat bonded together offer another type of multi-focal lens as discussed in U.S. Pat. No. 4,969,729 issued to Merle. Some of the problems associated with image jump and separation of image as one moves their eyes from distance to reading are addressed in U.S. Pat. No. 4,869,588 ('588 Patent) issued to Michael Walach, the inventor herein, and Frieder. The lens in the '588 Patent, shown in FIG. 2a, still obstructs vision when walking and driving, obstructs peripheral vision and has aggravating distortions around the reading area, amounting to 25% of the eyeglass area.

Despite the number of different types of multi-focal lenses, none has sufficiently addressed nor solved the problems noted herein. Accordingly, there exists a need for a multi-focal lens that is safe for walking, driving, climbing stairs and other activities. The needed lens does not have dividing lines, progressive corridors and blend zones and eliminates image jump, loss of image and distortion in a nonprogressive type of lens. The instant invention addresses these needs.

SUMMARY OF THE INVENTION

The instant invention provides a nonprogressive, multi-focal lens that is completely safe for all activities, including driving and climbing stairs, because it eliminates dividing lines, blend zones, image jump and loss of image as the eyes pass between distance area and reading segment. The inventive lens also has no distortion in any areas of the lens. Unlike bifocal lenses known previously, the invention does not have a dividing line or blend zones to interrupt vision between distance and reading. The foregoing is accomplished with a lens design having a unique construction between the reading area and distance segment and a reading segment shape and size that provides ample area for reading without obstructing or occluding vision in important areas of the lens. These important areas provide distance correction for, among other things, driving, safe walking, stair climbing, walking in the streets, and entering/exiting buses and streetcars. This is accomplished without the need for progressive style lenses.

The inventive lens comprises a first arcuate optical lens for distance combined with a second arcuate optical lens for reading in a way that eliminates the image jump, loss of image and distortion caused by dividing lines and blend zones. The second lens segment has a smaller radius of curvature which begins at a tangential component shared with the curvature of the distance portion. The common tangential component is located at the upper end of the reading segment where the reading segment begins. The tangential component and placement of the reading segment in relation to the distance area eliminates the obstructive dividing line resulting in an open ended reading segment. Unlike traditional reading segments which project outward and form a ledge and dividing line, as seen in FIGS. 9 and 10, the reading segment extends downward and somewhat inward, because of its smaller radius, for a predetermined distance. Thus, the reading segment, although convex, may appear countersunk compared to conventional flat top bifocals. The size, manufacturing, and positioning of the reading segment is calculated to eliminate the dividing line and ledge and to provide ample reading area without obstructing distance vision around the reading segment. The placement of the reading segment is placed in a wearer's natural line of sight for reading. In accordance with the foregoing structure and the unique configuration between of the distance and reading curvatures, there is no dividing line between the main lens and the reading lens visible to the patient. As a result, the lens of the instant invention provides uninterrupted and unobstructed vision, whereby there is no image jump, loss of image or distortion.

The reading segment may be substantially square, rectangular or elliptical in shape and has an open top end so that it appears "U" shaped or "C" shaped. The "U" or "C" shape depicts the fact that the reading and distance lenses are integrated at a common tangential segment that eliminates the dividing line and ledge. In addition, the lens has a smaller reading segment and no blend zones to interfere with peripheral and downward vision. The inventive lenses are beneficial for all patients requiring bifocals and especially for active people. Patients in all occupations, vocations, and activities benefit from the continuous, uninterrupted vision provided by the instant invention. The revolutionary lenses described herein are the first ever to offer these important benefits.

In accordance with the foregoing, it is an object of the instant invention to integrate distance and reading vision in the same lens without lines, image loss, image jump, or separation between the two viewing fields and in a lens that is completely safe to walk, run and drive in.

It is another object of the instant invention to provide an ophthalmic bifocal lens with smooth, continuous, and uninterrupted vision such that the scanning eye notices no change between distance and reading.

It is an additional object of the instant invention to provide a bifocal lens without a visible line between the reading lens and distance lens.

It is a further object of the instant invention to provide a bifocal lens with no blend zones.

It is another object of the instant invention to provide a bifocal lens that provides unobstructed peripheral and downward vision for safe driving, walking in the streets, stair climbing and taking steps to and from a bus, streetcar, etc.

It is also an object of the instant invention to provide a bifocal lens that combines cosmetic appeal with clear optics for both distance and reading.

It is still another object of the instant invention to provide a bifocal lens that experiences no image jump, loss of image, obstruction or interruption as the eyes move between the distance area and reading segment.

It is also an object of the instant invention to provide a bifocal lens having no distortion in any area of the lens.

It is still an additional object of the invention to provide a bifocal lens that provides substantially 100 percent clear peripheral vision.

It is still a further object of the invention to provide a bifocal lens that is cost effective and easy to manufacture.

It is yet another object of the invention to provide completely spherical distance coverage for central and peripheral distance viewing.

It is yet an additional object of the instant invention to provide a multi-focal lens that is completely safe and functional for active people requiring the aid of bifocal lenses.

In accordance with these and other objects which will become apparent hereinafter, the instant invention will now be described with particular reference to the accompanying drawings.

DESCRIPTION OF THE PREFERRED EMBODIMENTS

Figure 3:
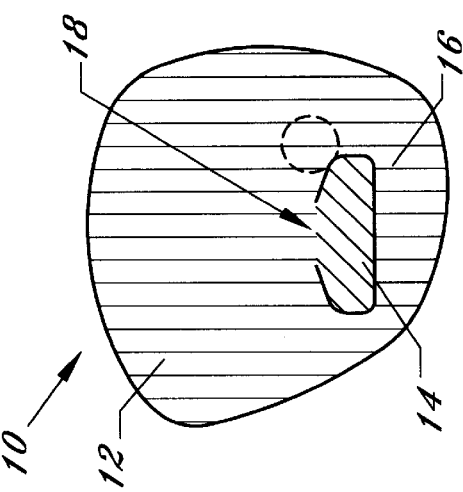
FIG. 3 illustrates a front view of a lens in accordance with the present invention, illustrating the "U" or "C" shaped top reading segment.

With reference to the drawings, FIGS. 3–8 depict the preferred embodiment of the nonprogressive, multi-focal/bifocal lens of the instant invention, referenced by numeric character 10. The inventive lens 10 disclosed herein generally comprises a first/distance arcuate lens 12 and a second/reading arcuate lens 14 which is configured together with the first lens 12 such that there is a U top opening at the upper end of the second lens 14, as shown in FIG. 3. The second lens 14 has a shorter radius R2 than the distance lens radius R1 to enhance close or reading vision. The second lens 14 is oriented with respect to the main lens 12 so that it shares a tangential component with the distance lens 12 at opening 18 such that the prior art dividing lines eliminated. That is, the instant invention eliminates the dividing line between the distance and reading lenses 12, 14 found in traditional bifocals by finding the segment where the reading and distance area of lenses 12, 14 have co-existing curvatures. The result is a bifocal lens 10 having no lines, no image jump, no loss of image continuity, no distortion in the viewing area, and no confusion. Consequently, the inventive lens 10 offers smooth, continuous transitional vision so that patients can view distal and proximal objects without noticing change therebetween. In addition, the reading segment 14 is sized to accommodate reading without interfering with peripheral vision and downward directed vision. The relative size of the reading segment 14 in comparison to existing bifocals is reflected in FIG. 1c.

Figure 5:
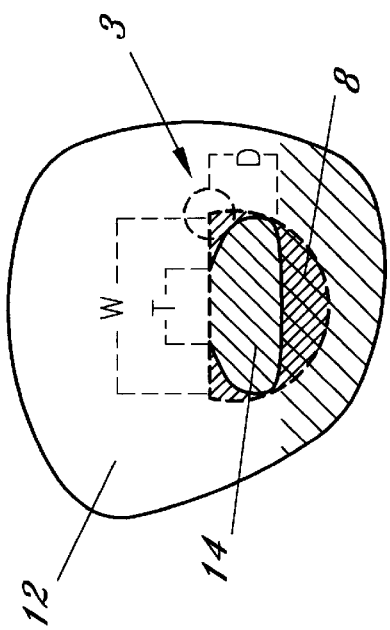
FIG. 5 is a front view of the lens in accordance with the present invention, illustrating the preferred reading segment superimposed over a prior art reading segment.
Figure 4:
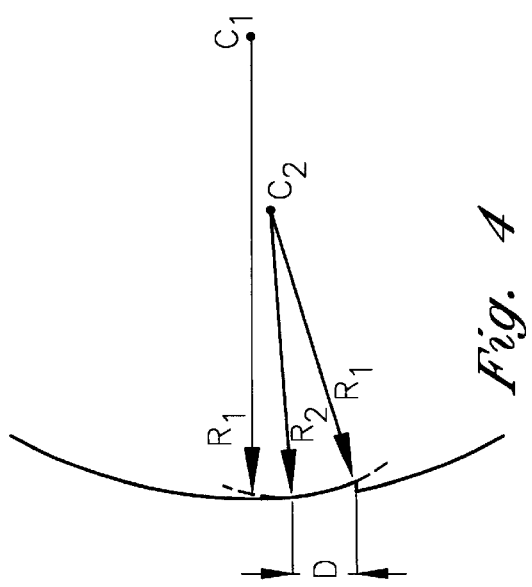
FIG. 4 provides a side view geometry of a lens designed in accordance with the present invention showing the radius of curvature for the reading lens, the radius of curvature for the distance/base lens, the resulting segment and the reading segment depth.
Figure 6:
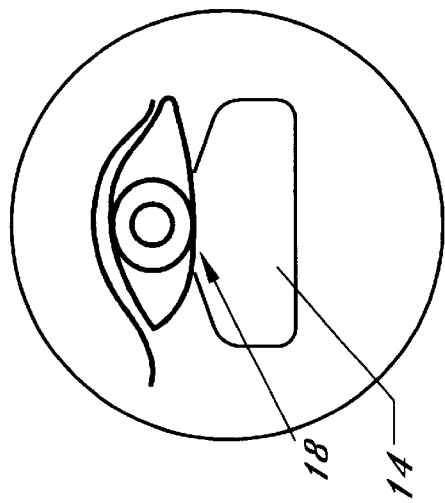
FIG. 6 is a front view of the lens designed in accordance with the present invention, illustrating the relative orientation of one's eye and transition T.
Figure 7:
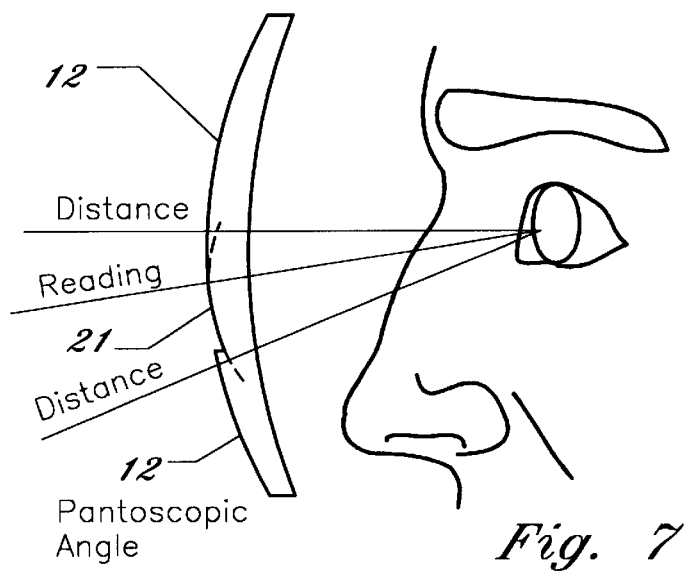
FIG. 7 is a side view of a lens designed in accordance with the instant invention, illustrating the distance and reading lines of sight.

Referring to FIGS. 4–6, the reading segment 14 has a smaller radius of curvature R2 than the distance lens radius R1. The reading segment is oriented with respect to the distance lens 14 so that the two lenses 12, 14 share a substantially common arc at a coexisting tangent. This unique configuration eliminates the dividing line responsible for image jump and loss of image. As a result of the orientation between the lenses and by design, the optical center for the reading lens 14 is located at the top of the reading segment 14 and is offset from the optical center of the distance lens 12. With reference to FIG. 4, the convex reading segment 14 begins at opening 18 and appears to tilt inward because of the diverging curvatures. The reading segment has an open top end 18, no line or blend zones obstructing the eye as it moves between the lenses, and a predetermined width W, depth D, and transition T. The distance area of the lens 12 begins again below the reading segment after depth D, so that the wearer has clear vision when looking down, as shown in FIGS. 4 and 7. There are also no blend zones between the reading and distance segments 14, 12 to obstruct peripheral and downward directed vision.

The reading segment 14 has dimensions which may vary to accommodate the needs of individuals and professionals. The size of the reading segment is limited to an area which provides for comfortable reading of standard documents and print, but may vary for active people and professionals. In the preferred embodiment, the reading lens 14 generally defines a width W that minimizes obstructions from the wearer's peripheral vision. It can be increased or decreased in accordance with vocational demands or requirements. For instance, the reading segment 14 may be approximately 26 mm wide, or less than 28 mm, and approximately 10 mm deep. The transition corridor 18, practically speaking, appears to be approximately 10 mm wide. This is because of the tangential configuration of the arcuate fields of the reading segment 14 and distance lens 12. It should be noted, however, that these dimensions may vary without departing from the scope and spirit of the instant invention.

With reference to FIG. 4, the distance lens 12 has a radius of curvature $R_1$ and center of curvature $C_i$. The second lens 14 has a center of curvature $C_2$ offset from $C_1$ and a radius of curvature $R_2$. The radius of curvature $R_2$ and center $C_2$ are positioned and designed with respect to the first lens 12 to form a substantially common, unobstructive, and invisible corridor between the distance and reading segment T. That is, along tangential component/corridor T, the first and second lens have or share a common arc. This provides an unobstructive corridor for continuous vision as the eye scans between the distance and reading segments 12, 14. In addition, this design serves to remove obstructions 3 from peripheral vision.

One method of manufacture comprises the use of molds. The mold conforms with the shape shown in FIG. 4 and includes a section depth D and radius R2 that forms reading segment 12. Outside the reading section, the mold has a radius of curvature R1 corresponding to the distance area.

The curvatures described herein are preferably spherical in nature. This is important for providing clear, undistorted areas of vision through the main lens 12 and reading lens 14. In addition, the spherical dimensions $R_1$–$R_2$ and $C_1$–$C_2$ and method of construction disclosed herein permit the two lenses 12, 14 to correspond at the predetermined segments shown and allow the lens 10 to be made without the obstructing dividing lines. The instant invention 10 provides unobstructed vision when walking, does not obstruct rear view mirror vision while driving, and does not affect peripheral visions. The inventive lens 10 also has 0.00 percent of its area distorted.

Figure 1A:
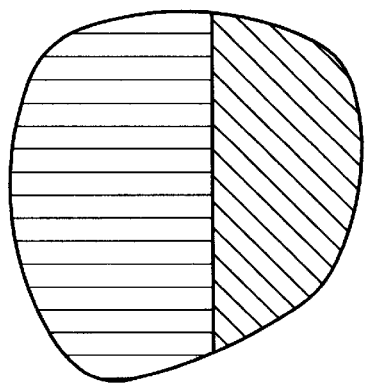
FIG. 1a illustrates a front view of a prior art executive bifocal lens.
Figure 1B:
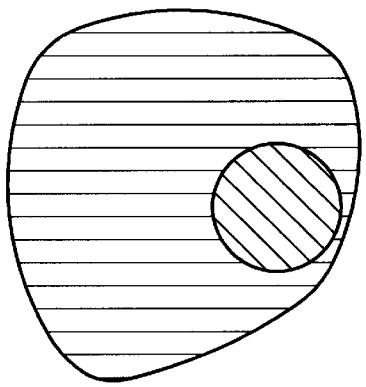
FIG. 1b illustrates a front view of a prior art round bifocal lens.
Figure 1C:
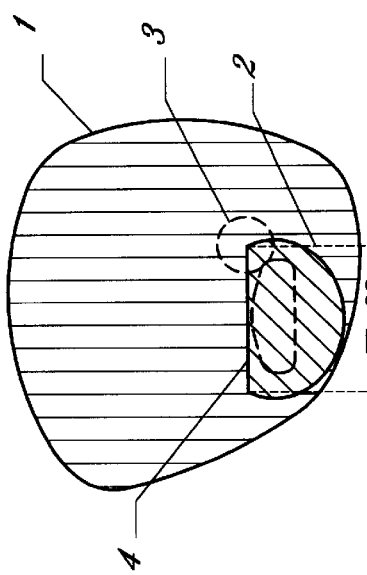
FIG. 1c illustrates a front view of a prior art flat-top bifocal lens.
Figure 2A:
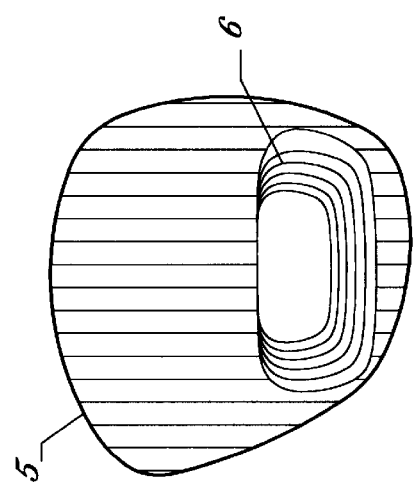
FIG. 2a is a front view of the prior art lens in the '588 Patent.
Figure 2B:
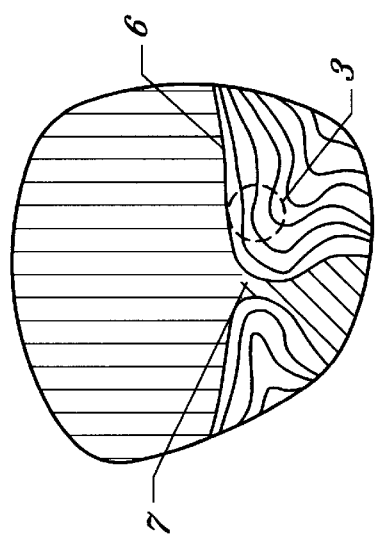
FIG. 2b is a front view of a prior art progressive lens.
Figure 8:
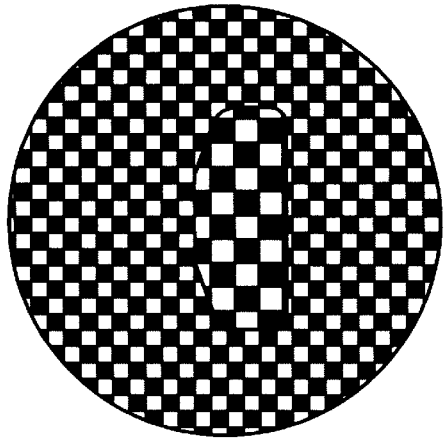
FIG. 8 is a front view of the lens in accordance with the present invention, illustrating the continuous transition between the distance area and reading segment, as well as the magnification between the two lenses.
Figure 9:
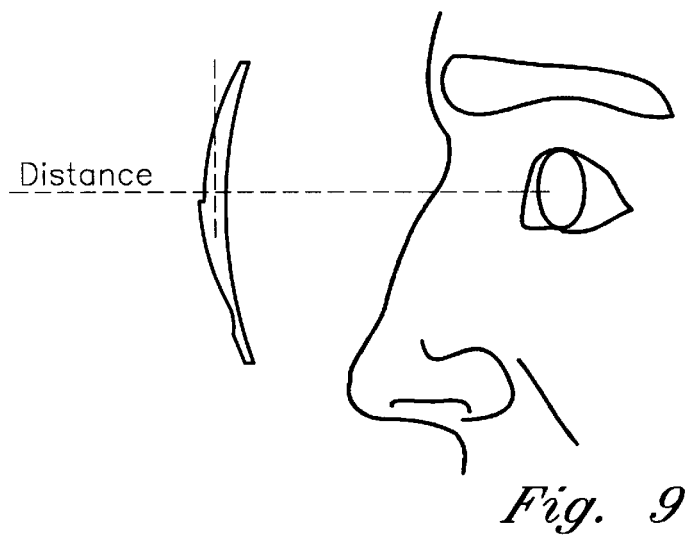
FIGS. 9 and 10 show side views of a prior art lens having a flat top bi-focal segment and illustrates the obstruction caused by the ledge and dividing line when moving the eyes between distance vision and reading vision.
Figure 10:
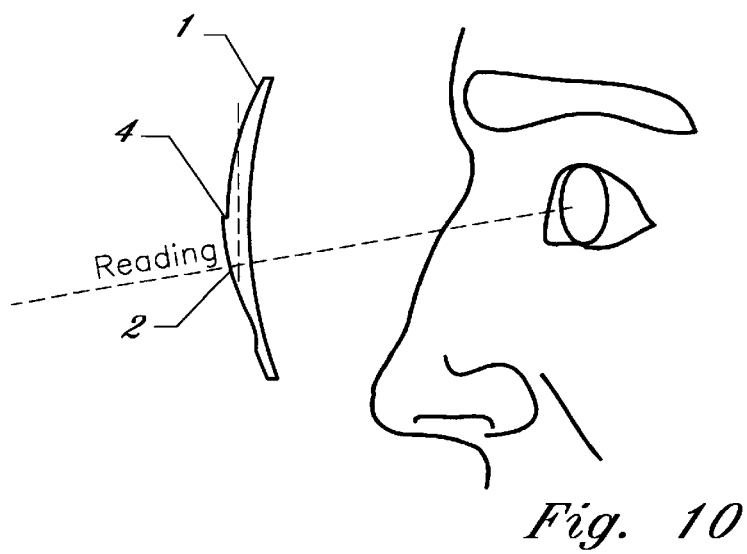

The connection between the reading lens 14 and distance lens 12 is carefully constructed so that there are no lines or blend zones in the patient's visual pathway. This is important for preventing distortion. For instance, transition T is defined by the common are between the distance lens 12 and reading lens 14 and is invisible to the wearer when moving the eyes between the distance and reading segments 12, 14, as shown in FIGS. 4 and 5. These advantages over prior art lenses are depicted in FIGS. 1c and 5, where the reading segment 14 is shown superimposed over a prior art reading segment. Because of the unique design of the inventive lens 10, as shown in FIGS. 4 and 7, obstruction areas 3 and 8 are eliminated. Consequently, the invention 10 is able to provide an unobstructed transition to the reading segment 14 and completely unobstructed and undistorted vision for central, downward, and peripheral distance viewing. The segment shape, particularly the curved top without a visible transition lines, facilitates easy patient adaptation. The foregoing features of the invention are illustrated in FIG. 8 which shows a continuous transition between the two lenses 12, 14 for simultaneous distance and near vision and an enlarged image inside the second lens 14. In comparison with FIGS. 9 and 10, it can be seen that the prior art flat top bifocals have a ledge and dividing line 4 which obstructs vision. By contrast, the instant invention provides a smooth, unnoticeable transition between distance and reading vision, as shown in FIG. 7.

The other specifications of the invention may include the following. The lens material may comprise a CR-39 hard resin, or similar material, standard tinting, A/R coating and edging. The lens 10 may also include scratch-resistant coating for reliable, clear vision and comfort as is standard in the art. A bifocal segment 14 width of less than 28 mm may also be used, but may vary without departing from the scope and spirit of the invention.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A non-progressive, multi-focal ophthalmic lens for simultaneously providing enhanced distance vision and near-viewing vision without obstruction from a dividing line as a patient moves its eyes between a distance viewing line of sight and a near viewing line of sight, said lens comprising:

a first arcuate transparent area for distance viewing having a first radius of curvature;

a second arcuate transparent area for near viewing having a second radius of curvature, said second area radius of curvature being shorter than said first area radius of curvature, said first area surrounding said second area, said second area having a top edge joining said second area and said first area, said second area being oriented in substantial alignment with the near viewing line of sight; and a non-obstructive, invisible transition corridor defined by a tangential component common to said first area and said second area, said first area and said second area sharing a common arc at a co-existing tangent, the optical center for the near viewing lens being located at the top of the near viewing lens area, said transition corridor preventing image jump, loss of image, and viewing distortion.

2. A lens as recited in claim 1, wherein said second area appears substantially "C" shaped when rotated approximately ninety degrees.

3. A lens as recited in claim 1, wherein said second area appears substantially U-shaped when joined to said first area, said transition corridor being proximal the open end of said U shape.

4. A lens as recited in claim 3, wherein said second area defines a predetermined area.

5. A lens as recited in claim 4, wherein said second area has a width of less than 28 mm.

6. A lens as recited in claim 4, further comprising a tint for enhancing the absorption of ultraviolet light.

7. A lens as recited in claim 4, further comprising a scratch-resistant coating.

8. A lens as recited in claim 4, wherein said lens is manufactured from hard resin.

9. A lens as recited in claim 4, wherein said second area has a predetermined depth.

10. A lens as recited in claim 4, wherein said lens is manufactured from glass.

11. A lens as recited in claim 9, wherein said transition corridor exist because of said tangential component.

* * * * *